United States Patent [19]

Vanderbei

[11] Patent Number: 4,744,026

[45] Date of Patent: May 10, 1988

[54] METHODS AND APPARATUS FOR EFFICIENT RESOURCE ALLOCATION

[75] Inventor: Robert J. Vanderbei, Red Bank, N.J.

[73] Assignee: American Telephone and Telegraph Company, AT&T Bell Laboratories, Murray Hill, N.J.

[21] Appl. No.: 851,120

[22] Filed: Apr. 11, 1986

[51] Int. Cl.[4] .................... G06F 15/20; H04Q 3/66; H04M 7/00

[52] U.S. Cl. ................................ 364/402; 379/113; 379/221; 340/827

[58] Field of Search ............... 364/402; 379/113, 221; 340/827

[56] References Cited

U.S. PATENT DOCUMENTS

| | | | |
|---|---|---|---|
| 3,591,724 | 7/1971 | Yaku et al. | 379/137 |
| 4,284,852 | 8/1981 | Szybicki et al. | 379/221 |
| 4,345,116 | 8/1982 | Ash et al. | 379/221 |
| 4,669,113 | 5/1984 | Ash et al. | 379/221 |
| 4,704,724 | 11/1987 | Krishnan et al. | 379/221 |

OTHER PUBLICATIONS

Introduction to Operations Research, F. Hillier and G. Lieberman, 1980, pp. 91–109.
Technical Report No. 648, "An Extension of Karmarkar's Algorithm for Linear Programming Using Dual Variables", M. J. Todd et al., Cornell University, Jan. 1985.
"Efficient Implementation of a Class of Preconditioned Conjugate Gradient Methods", Siam J. Sci Stat Comput., vol. 2, No. 1, S. C. Eisenstat, Mar. 1981.
"Some Computational Experience and a Modification of the Karmarkar Algorithm", ISME Working Paper 85-105, T. M. Cavalier et al., The Pennsylvania State University.
"A Variation on Karmarkar's Algorithm for Solving Linear Programming Problems", Earl R. Barnes, IBM T. J. Watson Research Center.
"On Projected Newton Barrier Methods for Linear Programming and an Equivalence to Karmarkar's Projective Method", Gill et al., Stanford University, Technical Report Sol. 85-11, Jul. 1985.

Primary Examiner—Joseph F. Ruggiero
Assistant Examiner—Charles B. Meyer
Attorney, Agent, or Firm—Robert O. Nimtz; Henry T. Brendzel

[57] ABSTRACT

A method and apparatus for optimizing resource allocations is disclosed which utilizes the Karmarkar algorithm to proceed in the interior of the solution space polytope. At least one allocation variable is assumed to be unconstrained in value. Each successive approximation of the solution point, and the polytope, are normalized such that the solution is at the center of the normalized polytope using a diagonal matrix of the current solution point. The objective function is then projected into the normalized space and the next step is taken in the interior of the polytope, in the direction of steepest-descent of the objective function gradient and of such a magnitude as to remain within the interior of the polytope. The process is repeated until the optimum solution is closely approximated.

The resulting algorithm steps are advantageously applied to the phase of one problem of obtaining a starting point, and to the dual problem, where the free variable assumption produces unexpected computational advantages.

15 Claims, 6 Drawing Sheets

KARMARKAR ALGORITHM

FIG. 1
KARMARKAR ALGORITHM

FIG. 2

KARMARKAR ALGORITHM

FIG. 3

FREE VARIABLE ALGORITHM

FIG. 4

PHASE ONE ALGORITHM

METHODS AND APPARATUS FOR EFFICIENT RESOURCE ALLOCATION

TECHNICAL FIELD

This invention relates to systems for using the Karmarkar algorithm for resource allocation among a plurality of resource utilizers and, more particularly, to the use of free (unconstrained) variables in the linear programming model of such allocation problems to improve the speed and efficiency of the Karmarkar algorithm.

BACKGROUND OF THE INVENTION

The need for resource allocation decisions arises in a broad range of technological and industrial areas such as the assignment of transmission facilities in telephone transmission systems, the control of the product mix of a factory, the deployment of industrial equipment, inventory control, and others. Resource allocation in this context means, in general, the deployment of specific technological or industrial resources for the production of particular technological or industrial results.

Resource allocation decisions are typically subject to constraints on such allocations. Resources are always limited in overall availability and, furthermore, the usefulness of a particular resource in some particular application may also be limited. For example, the traffic-carrying capacity of each individual link in a telecommunications system is limited, while the overall traffic offered to the communications system is also limited. Each particular allocation of resources can be associated with a "payoff," i.e., a cost of that allocation or an allocation benefit (e.g., profit). The problem, then, is to allocate the resources so as to satisfy all of the constraints and, simultaneously, to maximize the payoff, i.e., minimize the costs or maximize the benefits.

One method of representing such allocation decision problems is called the linear programming model. Such a model consists of a number of linear expressions that represent the quantitative relationships among allocations, constraints and payoffs. An expression is said to be linear if it is the sum of constant coefficients multiplied by unknown allocation values. Many resource allocation problems, of course, cannot be represented by such linear expressions, but involve higher powers of the unknowns or other nonlinearities in the relationships and hence are not susceptible to linear programming approaches.

It should be noted that the resource allocation problems discussed above are real physical problems arising in real physical systems. While it is true that significant quantitative aspects of the physical problem can be represented by the linear programming model, the purpose of this model is to provide optimum values which are then used in the physical world to construct or operate a physical system. Linear programming models are typically used to design telephone systems, to schedule airline activities or to control petro-chemical processes.

The feasible solutions to linear programming problems are often modelled as a multi-dimensional geometric shape—a polyhedron with a surface made up of thousands of multi-sided planes or "polygons" based on the constraints of the problem. This polyhedron, which is technically termed a "polytope," is an organized representation of the problem's constraints.

To find an optimum solution from among the many feasible solutions of a linear programming problem, an algorithm or procedure is applied. Such procedures follow an imaginary line or path from point to point in or on the surface of the polytope. The points on this path are steps in a series of interim solutions to the problem. Each such step is called an iteration. Each step or iteration, in turn, consists of the processing of equations that consider many interrelated constraints and variables.

It has long been known that the optimum solution to any linear programming problem must lie at one of the vertices of the polytope. Successful algorithms or procedures for determining the optimum solution therefore follow a path which ultimately terminates at the optimum vertex. The speed of such algorithms depends, in part, on the number of steps and also, in part, on the complexity of each step.

One new method for solving linear programming models of physical allocation problems is called the Karmarkar algorithm, described in the article by N. K. Karmarkar entitled "A New Polynomial-Time Algorithm for Linear Programming," *Combinatorica* 4(4), pp. 373–395, 1984. Unlike the older Simplex algorithm, which proceeds on the surface of the constraint polytope from vertex to vertex, the Karmarkar algorithm begins in the interior of the constraint polytope and proceeds in radial steps to the optimum vertex. At each iteration of the Karmarkar algorithm, the polytope space is rescaled to place the current value of the allocation at the polytope center. Because of the radial nature of successive steps, far fewer steps are required to reach the optimum vertex and hence the Karmarkar algorithm presents the possibility of being much faster than the Simplex algorithm, particularly for larger-sized problems.

One problem in using the Karmarkar algorithm is in finding a starting point. The starting point must represent a feasible solution to the model, i.e., a point strictly within the interior space of the multidimensional constraint polytope. While there are many known methods for finding a starting point, none of these method is particularly efficient from a computational viewpoint.

Another problem in using the Karmarkar algorithm arises in exploiting the so-called dual model approach to the solution of linear programming problems. For each linear programming model stated in canonical form (the primal model), an objective function must be minimized while simultaneously satisfying all of the constraints on the solution. Such a model can be rewritten to require the maximization of a different, but related, objective function under different, but related, constraints. The solution to the rewritten model (called the dual model) is known to be extremely useful in sensitivity analysis, i.e., a determination of the the effect on the optimum solution of variations in problem parameters. Moreover, the primal and dual models approach a common solution from opposite directions. One commonly used criteria for terminating calculations is to stop when the primal and the dual allocation values are within some arbitrarily small value of each other.

While the dual model approach to the solution of linear programming problems provides and elegant stopping criteria and extremely useful sensitivity information, it also doubles the amount of computation required, since the primal model and the dual model must both be solved simultaneously.

SUMMARY OF THE INVENTION

In accordance with the illustrative embodiment of the present invention, the Karmarkar algorithm is modified so as to be able to handle free or unconstrained variables. The prior art canonical form of the Karmarkar algorithm operates on variables constrained in value by numerical bounds, usually in the domain of positive numbers, since the physical problem being modelled imposes corresponding physical constraints. By adjusting the Karmarkar algorithm so as to handle free variables, certain ancillary problems are rendered much simpler to solve, reducing the time and complexity of the required computations.

More specifically, the modified Karmarkar algorithm which can handle free variables provides a computationally efficient method for determining a strictly feasible starting point for applying the main Karmarkar algorithm. Since the determination of such a starting point is an essential preliminary step to the use of the Karmarkar algorithm, the methods and apparatus of the present invention provide a faster overall solution to linear programming models.

Furthermore, the modified Karmarkar algorithm which can handle free variables also provides a computationally efficient method for solving dual linear programming models, thus providing a faster dual solution to linear programming models.

In a very general sense, the computational efficiencies of the present invention arise from a judicious decomposition of the constraint matrix into constrained and unconstrained variables so as to insure relatively small and/or sparse matrices which must be inverted at each iterative step. Since the bulk of the computation time is tied up in such matrix inversions, any substantial reduction in the time required for matrix inversions results in substantial improvement in the running time, and hence the cost, of applying the Karmarkar algorithm.

DETAILED DESCRIPTION

The newly available Karmarkar algorithm for making optimum resource allocations with a linear programming model will first be discussed, and thereafter the modifications of the Karmarkar algorithm necessary to permit handling free variables will be taken up.

Figure 1:
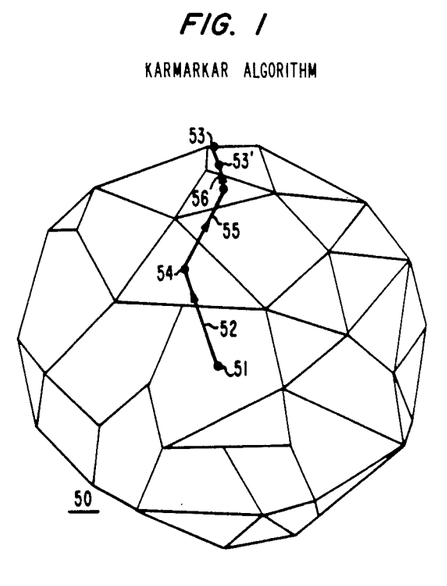
FIG. 1 is a graphical representation of the Karmarkar method for determining optimum resource allocations in linear programming models.

Before proceeding to a formal mathematical statement of the Karmarkar algorithm, a brief description of a graphical representation of the algorithm is in order. Referring more particularly to FIG. 1, there is shown a graphical representation of a convex, multidimensional polytope 50 which represents graphically the sum total of the constraints of a linear programming model. Each facet of polytope 50 in FIG. 1 is a partial plane which represents one linear contraint. The number of constaints is at least as large as the number of facets, while the number of unknown variables corresponds to the number of dimensions of the space in which polytope 50 exists. In FIG. 1, only three dimensions are represented because of the inherent limitations of human perception. The number of dimensions (variables) in practical linear programming models, however, can be hundreds, thousands and even millions.

In accordance with the Karmarkar algorithm, disclosed and claimed in the copending application of N. K. Karmarkar, Ser. No. 725,342, filed Apr. 19, 1985, and assigned to applicant's assignee, a starting point 51, located in the interior of polytope 50, is selected. As is well-known, all points in the interior and on the surface of polytope 50 represent feasible solutions to the linear programming model. Also as is well-known, in the absence of degeneracy, the optimum solution lies at one vertex of polytope 50, e.g., vertex 53. The Karmarkar algorithm proceeds radially, entirely in the interior of polytope 50, in steps 52, 55, 56 ... to successive points 54, et cetera, each closer to optimum point 53. Since the Karmarkar algorithm proceeds radially in the interior of polytope 50 instead of circumferentially on the surface, from vertex to vertex, as does the Simplex algorithm, the Karmarkar algorithm is inherently faster because it requires many fewer steps, particularly for larger models. The Karmarkar algorithm takes steps in the direction of the decreasing cost gradient in the polytope interior. Moreover, the Karmarkar algorithm involves rescaling the polytope space to equalize or centralize the distance of each successive point in the trajectory or path from all of the facets of polytope 50, thereby normalizing the effect of the cost gradient in all of the dimensions of the polytpe.

The formal statement of a linear programming model takes the form of an objective function which is to be maximized or minimized, and a plurality of constraint relationships which express the physical constraints on acceptable allocations. These constraints correspond to, and represent, as accurately as possible, the actual physical constraints present in the physical system. In standard vector notation, a typical linear programming model is expressed as follows:

Find a vector x of length n to $$\text{Minimize: } c \cdot x \tag{1}$$

Subject To: $Ax = b$ and $x \geq 0$
where $c = (c_1, c_2, \ldots, c_n)$ is a vector of cost coefficients, the operation "·" represents the vector dot product, $x = (x_1, x_2, \ldots, x_n)$ is a vector of allocation values, n is the number of such allocation values, $A = (a_{11}, a_{12}, \ldots, a_{ij}, \ldots, a_{mn})$ is an m by n matrix of constraint coefficients, $b = (b_1, b_2, \ldots, b_m)$ is a vector of m constraint limits.

In the canonical Karmarkar form of the linear programming model, the values of the components of x (the allocation values) are constrained to be non-negative values, but other limits are possible, as will be discussed below. All objective functions and all constraint relationships can be reduced to this form by simple algebraic manipulation. "Greater than or equal to" constraints can, for example, be changed to "equality" constraints by adding artificial "surplus" variables to the constraint matrix. Similarly, "less than or equal to" constraints can be changed to "equality" constraints by adding artificial "slack" variables. These techniques are well-known in the prior art.

The Karmarkar algorithm can be summarized as follows, using a highly compact vector notation. At each step of the iterative procedure, the algorithm computes a dual vector w. This vector is completely analogous to the vector of dual variables generated by the Simplex algorithm and used for sensitivity analysis. In accordance with the Karmarkar algorithm, the vector w is rescaled in accordance with the formula:

$$w = (AD_x^2 A^T)^{-1} AD_x^2 c. \quad (2)$$

The direction z of the step to the next set of allocation values is given by $$z = D_x^2(c - A^T w) \quad (3)$$

where, in equations (2) and (3), $D_x$ is the diagonal matrix of the current allocation values.

Using these values of w and z, two stopping variables can be defined:

$$\gamma = \max z_i/x_i \quad (4)$$

and $$\delta = -\min z_i/x_i^2 \quad (5)$$

where $\gamma$ can be called the complementary slackness coefficient and $\delta$ can be called the dual feasibility coefficient.

If M is defined as the maximum value of the $x_i$, one heuristic stopping criteria can be defined as follows. If $$\gamma + M\delta < (\epsilon/n)(|c \cdot x| + 1), \quad (6)$$

then stop, where $\epsilon$ is an arbitrarily small error measure and n is the number of variables x. If inequality (6) is not satisfied, a step is taken in the direction z from the current allocation x to get a new allocation, i.e., $$x \leftarrow x - \alpha Z/\gamma \quad (7)$$

where $0 < \alpha < 1$ is a fixed value much like that defined by Karmarkar. Using the new allocation, the algorithm calls for returning to equation (2) and continuing the iteration until inequality (6) is satisfied. Once inequality (6) is satisfied, the primal objective value is given by $(c \cdot x)$ and the dual objective value is given by $(w \cdot b)$. If the problem requires a maximization model, then the step direction z is negative. If the lower bound is non-zero, then x is replaced by $(x - 1)$, where 1 is the lower bound. If the upper bound u is finite, then x is replaced by $(u - x)$.

Figure 2:
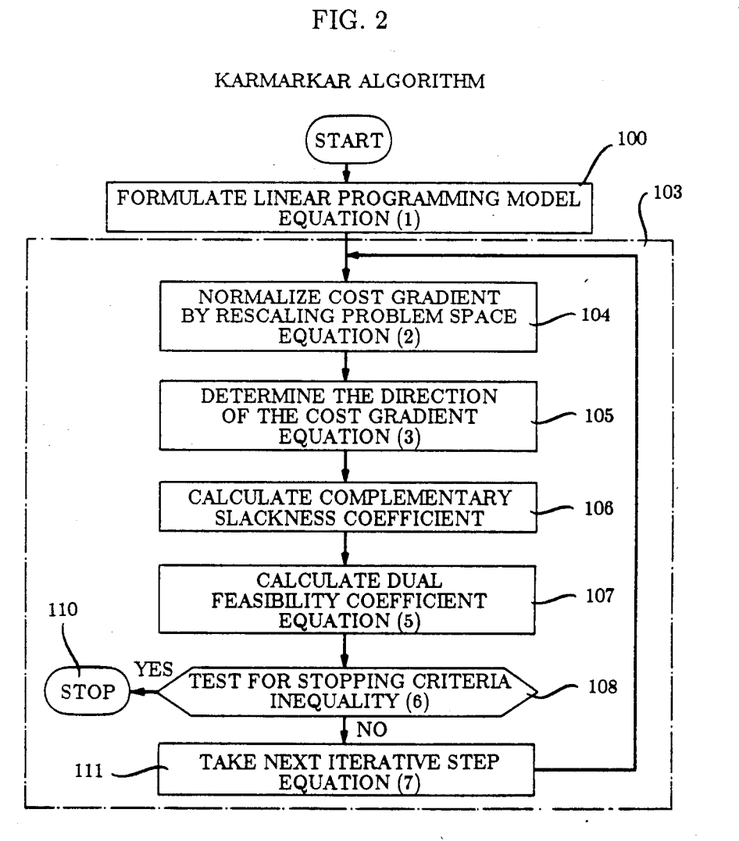
FIG. 2 is a general flow chart of the Karmarkar method for solving linear programming models.

A flowchart for this expression of the Karmarkar algorithm is shown in FIG. 2 of the drawings. As shown in FIG. 2, it is first necessary to formulate the linear programming model in box 100. A strictly feasible starting point x is then selected and used as the starting point for the iterative procedure in dashed box 103. Techniques for selecting the strictly feasible starting point will be discussed hereinafter. The balance of FIG. 2, contained in dashed box 103, is the iterative portion of the procedure in accordance with the Karmarkar algorithm.

Iterative procedure 103 of FIG. 2 comprises the following steps. Given a strictly feasible allocation of the components of x:

(1) In box 104, rescale the space of the polytope so as to place the dual variable w at the center of the polytope, thereby normalizing the cost gradient in all dimensions in accordance with equation (2);

(2) In box 105, calculate the direction of steepest descent of the cost (objective) function according to equation (3);

(3) In box 106, calculate the complementary slackness coefficient in accordance with equation (4);

(4) In box 107, calculate the dual feasibility coefficient in accordance with equation (5);

(5) In decision box 108, test the current values of the variables in accordance with the stopping criteria of inequality (6);

(6) If the stopping criteria is satisfied in decision box 108, terminate in box 110;

(7) If the stopping criteria is not satisfied in decision box 108, step in the direction of the negative gradient of the objective function in accordance with equation (7) in box 111, set the current allocation to the new allocation value, and reenter box 104.

In the following pages, the basic Karmarkar algorithm described above in connection with FIG. 2 will be modified so as to handle free or unbounded variables, rather than variables limited to positive values. The particular method of implementation of the free variable solution described here can be used for solving general linear programming models. It will be particularly useful, however, in deriving exceptionally simple and efficient formulae for implementing phase one and dual algorithm models. The phase one model is used for finding a starting point which is strictly feasible, i.e., which is on the inside of polytope 50 (FIG. 1). In accord with the present invention, this phase one model can be substantially simplified with the hereinafter derived free variable version of the Karmarkar algorithm.

The primal Karmarkar algorithm can suffer numerical problems because it is difficult to maintain (Ax=b) from one iteration to the next. In accordance with the present invention, this problem is circumvented by solving the dual problem instead of the primal problem. In further accord with the present invention, the dual solution to the linear programming model can also be substantially simplified with the hereinafter derived free variable version of the Karmarkar algorithm.

In order to derive the free variable version of the Karmarkar algorithm in accordance with the present invention, it is first necessary to restate the linear programming model so as to partition the variables into constrained and unconstrained (free) subsets:

$$\text{Minimize:} \begin{bmatrix} c_A \\ c_F \end{bmatrix} \cdot \begin{bmatrix} x \\ y \end{bmatrix} \quad (10)$$

$$\text{Subject To: } [A \; F] \begin{bmatrix} x \\ y \end{bmatrix} = b$$

$$1 \leq x \leq u$$

$y$ is free, where l and u are the lower and upper bounds, respectively, of the x variables, and the components of y are free (unbounded).

In order to derive the free variable algorithm in accordance with the present invention, suppose that y has finite lower and upper bounds. It is possible to then take the limits as these bounds tend to infinity. The result of these assumptions and procedures is the following algorithm:

The step direction z of equation (3) is partitioned into two pieces, one free and one constrained:

$$z = \begin{bmatrix} z_A \\ z_F \end{bmatrix}$$

The resulting algorithm, modified to handle free variables, can be expressed as follows:

$$z_F = (F^T B F)^{-1}(c_F - F^T B A D_x^2 c_A) \quad (11)$$

$$w = B A D_x^2 c_A + B F z_F \quad (12)$$

$$z_A = D_x^2(c_A - A^T w) \quad (13)$$

where $B = (A D_x^2 A^T)^{-1}$. The first term in expression (12) is identical to equation (2) when there are no free variables. The stopping variables of equations (4), (5) and (6) can be adjusted for the free variables y as follows:

$$\gamma = \max[(z_A)_i/(x_i - l_i) \vee -(z_A)_i/(u_i - x_i)] \quad (14)$$

$$\delta = -\min[(z_A)_i/(x_i - l_i)^2 \wedge -(z_A)_i/(u_i - x_i)^2] \quad (15)$$

$$M = \max(x_i - l_i) \wedge (u_i - x_i) \quad (16)$$

The stopping criteria is then given by the following. If $$\gamma + M\delta < (\epsilon/n)(|c_A \cdot x + c_F y| + 1) \quad (17)$$

then stop. If inequality (17) is not satisfied, the new allocation is derived from the old by the relation $$x \leftarrow x - \alpha z_A/\gamma \quad (18)$$

$$y \leftarrow y - \alpha z_F/\gamma \quad (19)$$

and the process is continued.

Figure 3:
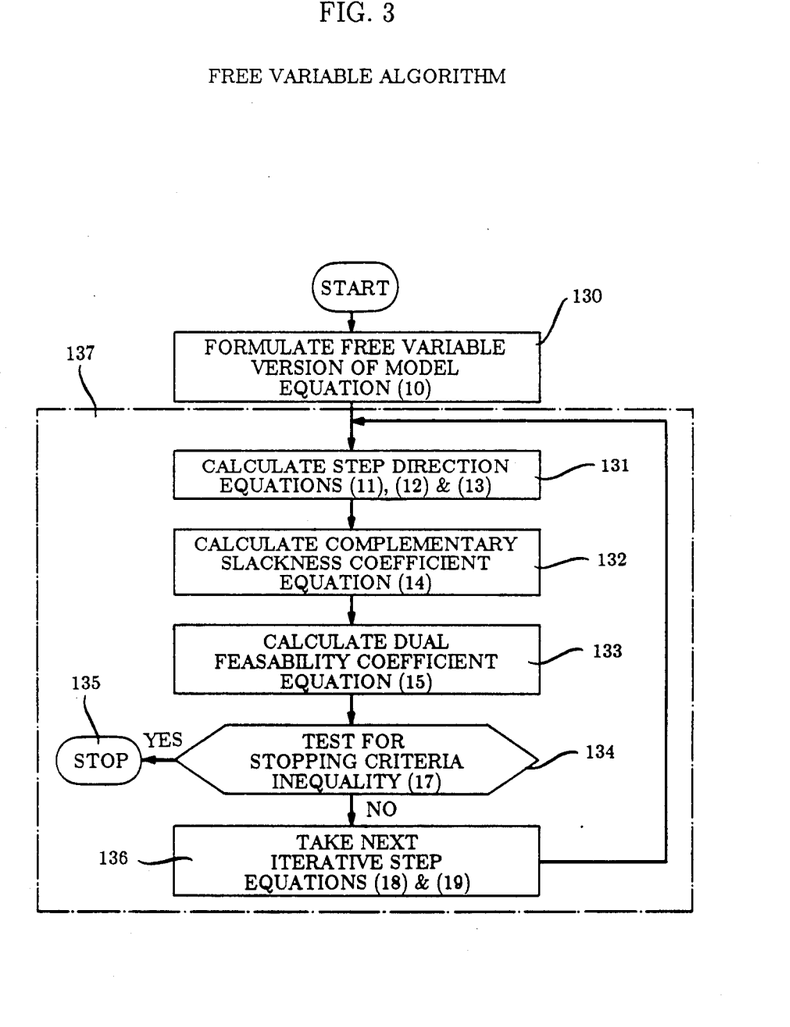
FIG. 3 is a flow chart of a modified Karmarkar algorithm modified to introduce free variables in accordance with the present invention.

A flowchart for this modified version of the Karmarkar algorithm is shown in FIG. 3 of the drawings. As shown in FIG. 3, it is first necessary to formulate the free variable version of the linear programming model in box 130. A strictly feasible starting point x is then selected and used as the starting point for the iterative procedure in dashed box 137. The balance of FIG. 3, contained in dashed box 137, is the iterative portion of the procedure in accordance with the free variable version of the Karmarkar algorithm.

Iterative procedure 137 of FIG. 3 comprises the following steps. Given a strictly feasible allocation of the components of x:

(1) In box 131, rescale the space of the polytope so as to place the dual variable w at the center of the polytope, thereby normalizing the cost gradient in all dimensions, and calculate the step direction, all in accordance with equations (11), (12) and (13);

(2) In box 132, calculate the complementary slackness coefficient in accordance with equation (14);

(3) In box 133, calculate the dual feasibility coefficient in accordance with equation (15);

(4) In decision box 134, test the current values of the variables in accordance with the stopping criteria of inequality (17);

(5) If the stopping criteria is satisfied in decision box 134, terminate in box 135;

(6) If the stopping criteria is not satisfied in decision box 134, step in the direction of the negative gradient of the objective function in accordance with equations (18) and (19) in box 136, set the current allocation to the new allocation value, and reenter box 131.

The modified Karmarkar algorithm derived above leads to an extremely efficient phase one algorithm for finding an initial starting point (or demonstrating model infeasibility). Following is the derivation of the phase one algorithm in accordance with the present invention.

The phase one model can be stated, in free variable form, as $$\text{Minimize: } y \quad (20)$$

$$\text{Subject To: } [A \; \rho] \begin{bmatrix} x \\ y \end{bmatrix} = b$$

$$1 \leq x \leq u$$

$y$ is free, where the free variable residual $\rho$ of the constraint matrix is given by $(\rho = b - A\xi)$, where $\xi$ satisfies $(1 < \xi < u)$.

It should first be noted that $$\begin{bmatrix} \xi \\ 1 \end{bmatrix}$$

is a feasible solution to model (20). Also note that, if $$\begin{bmatrix} x \\ 0 \end{bmatrix}$$

is a feasible solution to model (20), then $Ax = b$, and the value of x is a strictly feasible solution to the main linear programming model. This value of x is therefore a suitable starting point for the main algorithm of FIG. 2. The algorithmic strategy will therefore be to start with $y = 1$, and attempt to drive y to zero on each and every iteration. This results in a step direction z given by $$z \, \alpha \begin{bmatrix} -D_\xi^2 A^T B \rho \\ 1 \end{bmatrix} \quad (21)$$

Using equations (14) and (15) to calculate the stopping parameters $\gamma$ and $\delta$, the next step involves two possibilities. First, if $\gamma < 1$, then take a step which brings y to zero exactly, i.e., $$x \leftarrow x - z \quad (22)$$

and stop, using the corresponding value of x as the starting value. On the other hand, if $\gamma \geq 1$, the take the usual step of $$x \leftarrow x - \alpha z/\gamma \qquad (23)$$

and go back to equation (21). At the beginning of each iteration, the residue $\rho$ is recalculated, and hence every iteration is an attempt to force y from one to zero.

The phase one algorithm based on the free variable algorithm can be summarized as follows:

$$\rho = b - Ax \qquad (24)$$

$$z = -D_x^2 A^T B \rho \qquad (25)$$

$$\gamma = \max[z_i/(x_i - l_i) \vee -z_i/(u_i - x_i)] \qquad (26)$$

$$\delta = -\min[z_i/(x_i - l_i)^2 \wedge -z_i/(u_i - x_i)^2] \qquad (27)$$

$$M = \max[(x_i - l_i) \wedge (u_i - x_i)]. \qquad (28)$$

If $$\gamma + M\delta < \epsilon/n \qquad (29)$$

then stop (there is no feasible solution to the model). If $$\gamma < 1$$

then $$x \leftarrow x - z \qquad (30),$$

and terminate with x as the starting value; otherwise set $$x \leftarrow x - \alpha z/\gamma \qquad (31)$$

and return to equation (24).

Figure 4:
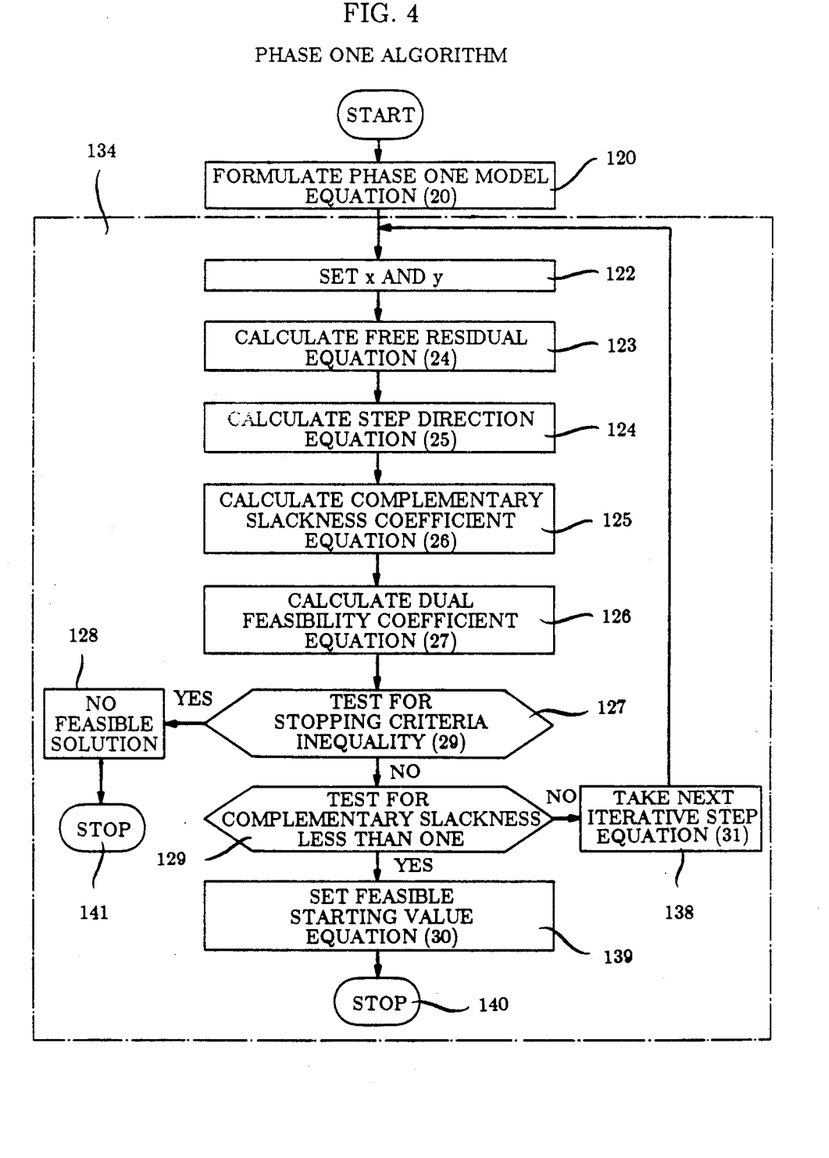
FIG. 4 is a flow chart of the modified Karmarkar algorithm in accordance with the present invention to provide a more efficient phase one (starting point) algorithm for solving linear programming models.

The phase one algorithm summarized in equations (24) to (31) is shown in the flowchart of FIG. 4 of the drawings. Referring to FIG. 4, the phase one model is formulated in standard form in box 120. The initial values of x and y are set in box 122, i.e., $x=\xi$ and $y=1$. The dashed box 134 represents the iterative portion of the algorithm which involves the following steps:

(1) Calculate the value of the unconstrained residual $\rho$ in box 123 in accordance with equation (24);

(2) Determine the direction of the gradient of y in decision box 124 in accordance with equation (25);

(3) Calculate the complementary slackness coefficient in box 125 in accordance with equation (26);

(4) Calculate the dual feasibility coefficient in box 126 in accordance with equation (27);

(5) Test the stopping criteria of inequality (29) in decision box 127;

(6) If the test in decision box 127 is satisfied, the linear programming model has no feasible solutions (box 128); stop the process in box 141;

(7) If the test in decision box 127 is not satisfied, test the value of the complimentary slackness coefficient in decision box 129;

(8) If the complimentary slackness coefficient is less than unity in decision box 129, set the feasible starting value to the current iteration value in accordance with equation (30) in box 139 and terminate in box 140;

(9) If the complementary slackness coefficient is equal to or greater than unity in decision box 129, set the next iteration value in accordance with equation (31) in box 138 and return to box 122.

The phase one algorithm described above is substantially simpler to implement and substantially faster to execute than any known alternative method for finding an initial feasible solution with which to start the Karmarkar algorithm. It is therefore very useful in conjunction with the Karmarkar algorithm to reduce the overall time of allocating resources.

Having described the use of a free variable solution as a starting point for an extremely efficient solution to the phase one model, a similar approach will now be taken to derive an extremely efficient solution to the dual model. That is, a free variable form of the dual model likewise is simple to implement and extremely efficient to solve. For simplicity, a simplified version of the model is considered, where the upper bounds are infinite and the lower bounds are zero. This will simplify the exposition considerably. It is straightforword to extend this approach to the general case.

Using the notation developed above, the simplified dual model can be stated as follows:

Maximize: $b \cdot w$ (32)

Subject To: $A^T w \leq c$, w is free

Partitioning the dual variable into constrained and unconstrained subsets, the dual model above can be rewritten as:

$$\text{Maximize: } \begin{bmatrix} b \\ 0 \end{bmatrix} \cdot \begin{bmatrix} w \\ v \end{bmatrix} \qquad (33)$$

$$\text{Subject To: } [A^T I] \begin{bmatrix} w \\ v \end{bmatrix} = c$$

w is free $v \geq 0$

With this statement of the dual model, let $$z = \begin{bmatrix} z_w \\ z_v \end{bmatrix}$$

denote the partition of the step direction and let w and v represent the equivalent partition of the dual variables. Then, applying the free variable algorithm of equations (11) to (19), the phase two dual algorithm is given by:

$$z_w = -(AD_v^{-2} A^T)^{-1} b \qquad (34)$$

$$x = -D_v^{-2} A^T z_w \qquad (35)$$

$$z_v = +D_v^2 x = -A^T z_w \qquad (36)$$

$$\gamma = \max[(z_v)_i / v_i] \qquad (37)$$

$$\delta = -\min[(z_v)_i / v_i^2] \qquad (38)$$

$$M = \max v_i. \qquad (39)$$

if $$\gamma + M\delta < (\epsilon/n)(|b \cdot w| + 1), \qquad (40)$$

then stop. If inequality (40) is not satified, reset the dual variables $$w \leftarrow w - \alpha z_w / \delta \qquad (41)$$

$$v \leftarrow v - \alpha z_v / \delta \qquad (42)$$

and return to equation (34).

Figure 5:
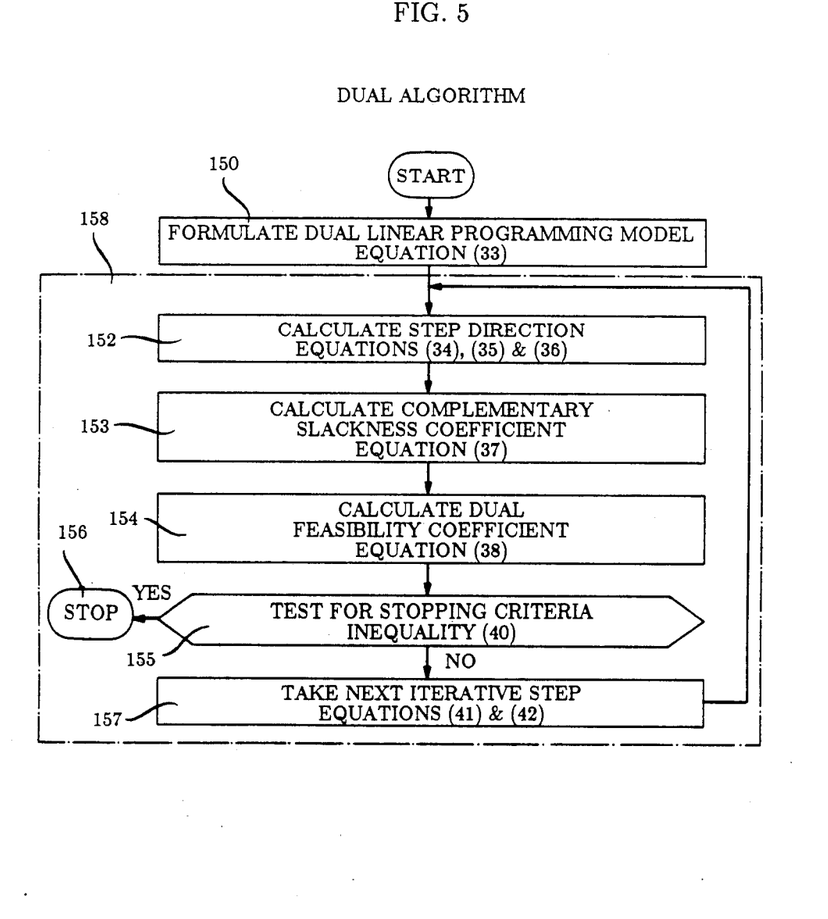
FIG. 5 is a flow chart of the modified Karmarkar algorithm in accordance with the present invention to provide a more efficient dual algorithm for solving linear programming models.

The dual algorithm described above is shown as a flowchart in FIG. 5 of the drawings. In FIG. 5, it is first necessary to formulate the linear programming model in its dual form in box 150. A strictly feasible starting point is then selected. The balance of FIG. 5, contained in dashed box 158, is the iterative portion of the dual algorithm procedure in accordance with the present invention.

Iterative procedure 158 in FIG. 5 comprises the following steps. Given a strictly feasible allocation of the components of x:

(1) In box 152, rescale the current allocation space so as to place the current allocation equidistant from all of the constraints, and calculate the direction of the next step, all in accordance with equations (34), (35) and (36);

(2) In box 153, calculate the complimentary slackness coefficient in accordance with equation (37);

(3) In box 154, calculate the dual feasibility coefficient in accordance with equation (38);

(4) In decision box 155, test the current allocation in accordance with inequality (40);

(5) If the stopping criteria is satisfied in decision box 155, utilize the optimum solution parameters of the current iteration and terminate in box 156; and (6) If the stopping criteria is not satisfied in decision box 155, take the next iterative step in accordance with equations (41) and (42).

The above-described dual model algorithm converges very quickly because much larger steps are possible than can be taken with the unmodified Karmarkar algorithm. The larger steps, in turn, are possible because of the numerical stability introduced by the present invention. More specifically, this numerical stability arises because the slack variables are recalculated on each and every iteration. In addition to this stability, the present invention causes the resource allocations to converge much more rapidly than the unmodified Karmarkar algorithm. Finally, the free variable modification is also essential to solving mixed integer problems, where some variables are constrained to take on only integer values.

Figure 6:
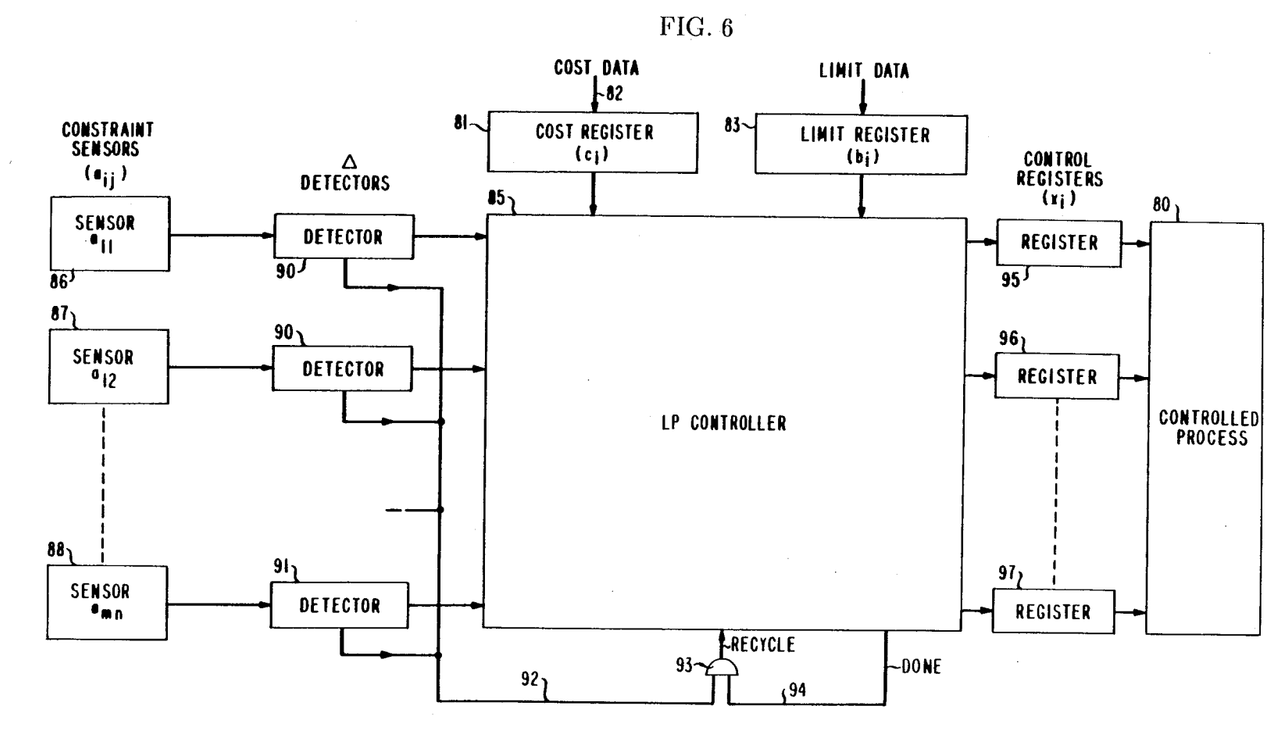
FIG. 6 is a block diagram of a resource allocation system using the methods of FIGS. 3, 4 or 5 to control resource allocations.

In FIG. 6 there is shown a process control system which controls a process 80. Process 80 may be a telephone communications system, a manufacturing process, a navigation process, or any other industrial or technological process which is to be optimized. A cost register 81 receives cost data on leads 82 representing the per unit costs of the various possible allocations of resources in controlled process 80. Cost data may be entered into register 81 from a computer terminal or from separate processes which dynamically determine these costs. While this cost data normally change relatively slowly, there is nevertheless the ability to update this data via input leads 82 whenever necessary. If there are non-zero limits (l and u in equation (10)) on the solution values, these limits, like the cost data, must be provided to LP Controller 85 by way of a data input register like register 81.

Similarly, a limit register 83 is provided to store a representation of the total physical limits on each specific resource allocation. These limits are likewise relatively static and can be entered via leads 84 into register 83 from a computer terminal or from a separate limit-determining process. The outputs of registers 81 and 83 are applied to a linear programming (LP) controller 85 which carries out the process summarized in the flowchart of FIGS. 3, 4 or 5. LP controller 85 is, in the preferred embodiment, a programmed digital computer having stored therein the program which implements the flowchart of FIGS. 3, 4 or 5. Controller 85 may also comprise a complex of hardwired circuits designed to carry out the procedures of FIGS. 3, 4 or 5, a plurality of parallel processors to take advantage of the possibilities for parallel execution of the procedure, or a plurality of programmed linear arrays programmed for this purpose.

A plurality of constraint sensors 86, 87, ..., 88 are provided to dynamically sense the constraint coefficients for the constraint relationships. Constraint sensors 86–88 are continually responsive to change in the environment of controlled process 80, which changes affect the constraint relationships and hence, must be tracked in order to control process 80. Each of constraint sensors 86–88 has a corresponding change (delta) detector 89, 90, ..., 91 which senses changes in the output of each of the respective sensors 86–88. A change-indicating signal from each of detectors 89–91 is applied to change bus 92 and thence to AND gate 93. Also applied to AND gate 93 is a signal from LP controller 85 on lead 94 indicating the termination of the execution of the procedure. The outputs from sensors 86–88 are applied through detectors 89–91, respectively, to controller 85.

In operation, the outputs of sensors 86–88 are used by controller 85 as the coefficients of the constraint matrix A of equations (10), (20) or (32). The cost data in register 81 are used as the cost vector (c) in equations (10), (20) or (32) and the limit data in register 83 are used as the limit vector (b) of equations (10), (20) or (32). Given these inputs, LP controller 85 is able to carry out the procedure of FIGS. 3, 4 or 5 and provide digital solution values (x's) to control registers 95, 96, ..., 97. The values in registers 95–97 are then used to control process 80.

Since LP controller 85 of FIG. 6 utilizes the extremely rapid procedures of FIGS. 3, 4 or 5, control values are available for registers 95–97 in a very short time. Moreover, as the constraints change, these changes are sensed by sensors 86–88, detected by detectors 89–91, and used to partially enable AND gate 93. When the procedure of FIGS. 3, 4 or 5 is complete, LP controller 85 generates control signals and transfers them to registers 95–97 and, simultaneously, generates an enabling signal on lead 94 to AND gate 93, completing the enablement of AND gate 93. The entire process is then repeated.

Depending on the complexity of the problem (the number of constraints sensed by sensors 86–88) and the stability of process 80, it is possible to more or less continually control process 80 by this method. Indeed, if the rate of change of the environmental factors sensed by sensors 86–88 is equal to or less than the rate of operation of LP controller 85, the process 80 will be controlled continuously. Higher rates of changes in the environment will introduce granularity into the control process, but will still permit near optimum operation, on the average, of the process 80. Indeed, given some history of the environmental changes, some predictive mechanism can be built into detectors 89-91 to predict the direction and magnitude of future changes in the outputs of sensors 86-88.

A typical type of problem in the telecommunications field to which the present invention can be applied is described in two articles in *The Bell System Technical Journal*, Vol. 60, No. 8, October 1981. A first article entitled "Design and Optimization of Networks with Dynamic Routing" by G. R. Ash et al. (p. 1787) describes the general telephone traffic routing problem while the second article, entitled "Servicing and Real-Time Control of Networks with Dynamic Routing," also by G. R. Ash et al. (p. 1821) describes an auxiliary problem of minimizing idle capacity due to erroneous predictions of traffic loads.

Other problems which would benefit from the new procedures herein described include industrial process control, deployment of personnel to provide customer services, blending of ingredients to form commercial products, oil refinery product mix, assignments of computer resources to a plurality of users, and many others. In each case, the cost (or benefit) coefficients must be measured or otherwise determined, the constraint limits must be established and the contributions of all the decision variables to these constraints also measured or determined. The result of executing the procedures is, in each case, the specification of a set of control parameters which, when applied to the real world situation, will produce an optimum process or apparatus.

It should be noted that the matrices involved in most practical linear programming models are sparse matrices and that sparse matrix techniques can also be used in evaluating the search direction z in FIGS. 3, 4 and 5.

While the present inventor has constructed significant improvements on the Karmarkar method for solving linear programming models, it is to be understood that the claims of this invention relate only to the application of these novel improvements to arrangements that determine the optimum allocation of resources in real world technological and industrial systems that lend themselves to a linear representation of the variables and constraints characterizing the system, i.e., physical arrangements that determine how resources are actually applied to optimize the performance of processes, machines, manufactures or compositions of matter. All other uses of the new method, such as computation research, algorithm research, or linear algebra research activities, form no part of the present invention. Similarly, use of the new method in non-technological or non-industrial systems likewise form no part of the present invention.

What is claimed is:

1. A method for allocating available industrial facilities among the users of said facilities so as to reduce the total cost of providing said facilities, said method comprising the steps of:
    tentatively and iteratively reassigning said available facilities to said users in accordance with the Karmarkar algorithm so as to reduce said total costs at each said reassignment,
    each said reassignment being determined by normalizing the previous assignment with respect to constraints on said allocations,
    during each said reassignment, adjusting the direction of changes in said previous assignments under the assumption that at least one of said constraints increases in value without limit,
    terminating said iterative reassigning steps when said costs are reduced to a preselected threshold to form a final reduced cost assignment, and
    allocating said facilities in accordance with the final reduced cost assignment.

2. The allocation method according to claim 1 wherein said final step of allocating is preceded by the steps of
    utilizing said facility assignments identified as final reduced cost assignment in claim 1 as the initial assignment of facilities in a further allocation of said facilities to reduce a different cost criteria, and
    repeating the steps of claim 1 using said different cost criteria.

3. The allocation method according to claim 1 wherein said reassigning step further includes the step of
    reassigning, at each iteration, both the cost minimizing (primal) allocations and the equivalent maximizing (dual) allocations of said facilities.

4. An optimized resource allocation system comprising:
    a first plurality of physical resources available for use,
    a second plurality of resource users using said physical resources, and
    means for assigning said resource users to said physical resources so as to reduce the cost of providing said resources, said assigning means including
    means for iteratively and tentatively selecting feasible ones of said assignments such that, at each iteration, each of said feasible assignments is centered within the interior of a normalized multidimensional convex feasible solution space,
    said iterative selecting means further comprising means for including the effect on successive selections of assuming that at least one of said resources increases in value without limit, and
    means for allocating said physical resources in accordance with the final one of said tentative assignments.

5. A system for optimizing the performance of a controlled process in accordance with an optimizing criterion, said system comprising:
    process control devices for controlling said process in response to control signal sets,
    a plurality of sensors for sensing variable conditions affecting the operation of said process,
    a plurality of data input devices for prescribing conditions affecting the operation of said process, and
    a linear programming controller responsive to said sensors and said input devices for providing improved control signal sets to said process control devices in accordance with the Karmarkar algorithm,
    said controller including means for iteratively identifying successive tentative strictly feasible control signal sets under the assumption of at least one unconstrained variable control signal, and selecting each next tentative control signal set along the steepest gradient of a normalized version of said optimizing criteria.

6. The improvement in linear programming methods for optimally allocating resources among a plurality of users which includes the steps of:
    introducing at least one free variable into said linear programming model,
    iterating on only strictly feasible allocations, and normalizing each strictly feasible allocation with respect to the constraints on said allocations.

7. A linear programming controller for use with a general purpose digital computer, said controller comprising:
   a computer program storage medium having a computer program stored thereon for execution by said digital computer, said program comprising
   means for processing a plurality of linear relationships defining a multidimensional convex polytope representing the set of feasible solutions to said plurality of linear relationships, and
   means, including a function to be optimized, for identifying that point on the boundary of said polytope representing the optimum solution to said plurality of linear relationships by the Karmarkar algorithm modified for at least one free variable.

8. A method for allocating industrial or technological resources $x_i$ ($i=1, n$) among a plurality of physical resource users subject to constraints $A_{ij}x_i \leq b_j$ and $x_i \geq 0$ ($i=1, n; j=1, m$) in such a manner as to optimize a cost function $c_{i/1} \cdot x_i$, said method comprising the steps of:
   (a) receiving information identifying said resources, said resource users, and said constraints;
   (b) partitioning said resources into constrained and unconstrained subsets x and y, respectively,
   (c) selecting an initial allocation $x_s$ and $y_s$ meeting said constraints,
   (d) determining the direction of the unconstrained partition $z_F$ of the next iteration of an iterative procedure for approximating said optimal cost in accordance with the formula $$z_F = (F^T B F)^{-1}(c_F - F^T B A D_x^2 c_A)$$

where $$B = (A D_x^2 A^T)^{-1}$$

and $D_x$ = the diagonal matrix of the current allocations of said constrained resources,
   (e) rescaling the space of said constraints with said diagonal matrix $D_x$ in accordance with the formula $$w = B A D_x^2 c_A + B F z_F$$

(f) determining the direction $z_A$ of the constrained partition of next iteration of said iterative procedure in accordance with the formulae $$z_A = D_x^2(c_A - A^T w)$$

(g) determining the complementary slackness coefficient of said current iteration from the formula $$\gamma = \max[(z_A)_i/(x_i - l_i) \vee -(z_A)_i/(u_i - x_i)],$$

(h) determining the dual feasibility coefficient $\delta$ of said current iteration from the formula $$\delta = -\min[(z_A)_i/(x_i - l_i)^2 \wedge -(z_A)_i/(u_i - x_i)^2)],$$

(i) testing said current iteration from the equality $$\gamma + M\delta < (\epsilon/n)(|c_A \cdot x + c_F y| + 1),$$

where $$M = \max(x_i - l_i) \wedge (u_i - x_i),$$

and $\epsilon$ = an arbitrarily small error measure,
   (j) if the test of step (i) is not satisfied, returning to step (d) with the new allocations $$x \leftarrow x - \alpha z_A/\gamma,$$

and $$y \leftarrow y - \alpha z_F/\gamma,$$

where $$0 \leq \alpha \leq 1,$$

(k) if the test of step (i) is satisfied, allocating said resources in accordance with said current allocation iteration values.

9. A method for utilizing the Karmarkar algorithm for allocating industrial or technological resources $x_i$ ($i=1, n$) among a plurality of resource users subject to constraints $\Sigma A_{ij}x_j = b_i$ and $x_i \geq 0$ ($i=1, n; j=1, m$) in such a manner as to optimize a cost function $c_i \cdot x_i$, said method comprising the steps of:
   (a) receiving information identifying said resources, said resource users, and said constraints;
   (b) formulating the dual model
      Maximize: $b \cdot w$
      Subject To: $A^T w \leq c$, w is free,
   (c) partitioning the maximizing portion of step (b) as follows:

$$\text{Maximize: } \begin{bmatrix} b \\ 0 \end{bmatrix} \cdot \begin{bmatrix} w \\ v \end{bmatrix}$$

$$\text{Subject To: } [A^T \, I] \begin{bmatrix} w \\ v \end{bmatrix} = c$$

w free $v \geq 0$ where v is a subset of unconstrained variables, and I is the identity matrix,
   (d) determining the centralized value of the current iteration, and the direction of the next iteration, of an iterative procedure for approximating said optimal cost in accordance with the formulae $$z_w = -(A D_v^{-2} A^T)^{-1} b,$$

$$w = -D_v^{-2} A^T z_w, \text{ and}$$

$$z_v = +D_v^2 x = -A^T z_w$$

where
$D_x$ = the diagonal matrix of the current allocations of said constrained resources,
   (e) determining the complementary slackness coefficient of said current iteration from the formula $$\gamma = \max[(z_v)_i/v_i],$$

(f) determining the dual feasibility coefficient $\delta$ of said current iteration from the formula $$\delta = -\min[(z_v)_i/v_i^2],$$

(g) testing said current iteration with the inequality $$\gamma + M\delta < (\epsilon/n)(|b \cdot w| + 1)$$

where $$M = \max(v_i),$$

and
$\epsilon$ = an arbitrarily small error measure, (h) if the test of step (g) is not satisfied, set $$w \leftarrow w - \alpha z_w/\gamma$$

and $$v \leftarrow v - \alpha z_v/\gamma,$$

and returning to step (c), (i) if the test of step (g) is satisfied, allocating said resources in accordance with said current allocation iteration values.

10. A method of allocating resources in accordance with the Karmarkar algorithm where physical resources, users of said resources and the constraints on the allocation of said resources to said users are represented by a polytope, where feasible allocations are points within said polytope, and where a preferred allocation of said resources to said users is carried out
  iteratively by stepping from the interior of a rescaled constraint polytope toward the optimum-valued vertex of said rescaled polytope, comprising the steps of:
  terminating said iterative stepping when $$\gamma + M\delta < \epsilon/n$$

where
$\gamma = \max(z_i/x_i);$
$\delta = -\min(z_i/x_i^2);$
$M = \max(x_i);$
$\epsilon$ = an arbitrary error metric;
$n$ = the number of allocation variables;
$x_i$ = the ith component of the current allocation of resources;
$z_i$ = the ith component of the direction of the next step; and allocating said resources in accordance with the values of said current allocation when said terminating step is taken.

11. A method of stopping iterations of the Karmarkar algorithm at substantially the optimum allocation values comprising the steps of
  determining the complementary slackness coefficient $\gamma$ in accordance with the formula $$\gamma = \max(z_i/x_i);$$

where
$x_i$ = the ith component of the current allocation value, and
$z_i$ = the ith component of the inverse gradient of the objective function at allocation value x;
determining the dual feasibility coefficient $\delta$ in accordance with the formula $$\delta = -\min(z_i/x_i^2);$$

and stopping said iterations when $$\gamma + M\delta < \epsilon/n$$

where M is the value of the maximum component of x, $\epsilon$ is an arbitrarily small error measure, and n is the number of components of x.

12. Apparatus for allocating resources in an optimal manner among users of said resources comprising
  means for receiving information concerning said users, concerning the availability of said resources and concerning constraints on the allocation of said resources,
  means, utilizing the Karmarkar algorithm, for iteratively approximating an optimum allocation of said resources among said users,
  means for stopping said iteratively approximating means when a function of the complementary slackness coefficient and the dual feasibility coefficient is less than a preselected error value, and
  means for allocating said resources in accordance with the last option allocating of said resources approximated by said iterative approximating means.

13. The apparatus according to claim 12 wherein
said complementary slackness coefficient is the value of the maximum ratio of the value of the direction component of the next iteration of said iterative approximating means and the corresponding allocation component.

14. The apparatus according to claim 12 wherein
said dual feasibility coefficient is the negative of the value of the maximum ratio of the direction component of the next iteration of said iterative approximating means and the square of the corresponding allocation component.

15. The improvement in linear programming methods for optimally allocating resources among a plurality of users which includes the steps of:
  introducing at least one free variable into the said linear programming model employed in said linear programming methods,
  iterating on only strictly feasible allocations, and
  normalizing each strictly feasible allocation with respect to the constraints on said allocations.

* * * * *